United States Patent
Mock et al.

(10) Patent No.: US 11,943,526 B2
(45) Date of Patent: Mar. 26, 2024

(54) INFRARED AND BROAD SPECTRUM ILLUMINATION FOR SIMULTANEOUS MACHINE VISION AND HUMAN VISION

(71) Applicant: Event Capture Systems, Inc., Mint Hill, NC (US)

(72) Inventors: Brian James Mock, Mint Hill, NC (US); John Graves Larkin, Gastonia, NC (US)

(73) Assignee: Event Capture Systems, Inc., Mint Hill, NC (US)

( * ) Notice: Subject to any disclaimer, the term of this patent is extended or adjusted under 35 U.S.C. 154(b) by 183 days.

(21) Appl. No.: 17/479,097

(22) Filed: Sep. 20, 2021

(65) Prior Publication Data

US 2022/0006933 A1 Jan. 6, 2022

Related U.S. Application Data

(63) Continuation of application No. PCT/US2020/023760, filed on Mar. 20, 2020.

(Continued)

(51) Int. Cl.
*G06V 10/141* (2022.01)
*H04N 23/56* (2023.01)
*H04N 23/73* (2023.01)

(52) U.S. Cl.
CPC ........... *H04N 23/56* (2023.01); *G06V 10/141* (2022.01); *H04N 23/73* (2023.01)

(58) Field of Classification Search
CPC ...... H04N 23/56; H04N 23/73; H04N 23/125; G06V 10/141; G03B 42/00;

(Continued)

(56) References Cited

U.S. PATENT DOCUMENTS

| 6,061,125 A | 5/2000 | Thomas et al. |
| 6,366,319 B1 * | 4/2002 | Bills ............ H04N 23/843 |
| | | 348/E9.01 |

(Continued)

FOREIGN PATENT DOCUMENTS

| CN | 106657752 A * | 5/2017 | ........... H04N 5/2256 |
| EP | 1314489 A2 | 5/2003 | |

(Continued)

OTHER PUBLICATIONS

CN106657752A Light filling apparatus and light filling method of front camera, 4 pages. (Year: 2023).*

(Continued)

*Primary Examiner* — Tuyen K Vo
(74) *Attorney, Agent, or Firm* — NK Patent Law (57) ABSTRACT

Disclosed herein is system for providing simultaneous machine vision illumination control and human vision illumination control. The system includes a first illumination control output that is configured to provide first illumination timing information for a first illumination source. The system also includes a second illumination control output configured to provide second illumination timing information for a second illumination source. The first illumination source is configured to provide a first frequency band of illumination for machine vision. The second illumination source is configured to provide a second frequency band of illumination for human vision. The first and second frequency bands are mutually exclusive. A related system is also disclosed herein.

20 Claims, 5 Drawing Sheets

Related U.S. Application Data (60) Provisional application No. 62/821,981, filed on Mar. 21, 2019.

(58) Field of Classification Search
CPC ............ G03B 2215/0567; G03B 15/02; H05B 45/20; H05B 45/305
See application file for complete search history.

(56) References Cited

U.S. PATENT DOCUMENTS

| | | | |
|---|---|---|---|
| 7,339,660 B1 | 3/2008 | Cohn et al. | |
| 2009/0243493 A1* | 10/2009 | Bergquist | G03B 15/05 315/149 |
| 2012/0258547 A1* | 10/2012 | Von Drasek | G01N 21/6486 436/172 |
| 2014/0157209 A1* | 6/2014 | Dalal | G06F 3/012 715/863 |
| 2014/0267944 A1* | 9/2014 | Ikeda | G06F 3/041 359/884 |
| 2015/0378099 A1* | 12/2015 | Rong | G02B 6/1225 385/14 |
| 2017/0061210 A1* | 3/2017 | Ollila | H04N 1/00307 |
| 2019/0041653 A1* | 2/2019 | Yeung | H04N 9/3164 |
| 2019/0049744 A1* | 2/2019 | Yeung | G02B 27/283 |
| 2020/0087430 A1* | 3/2020 | Clear | B01J 8/085 |
| 2020/0173849 A1* | 6/2020 | Nishimura | G01J 3/42 |
| 2020/0305784 A1* | 10/2020 | Van Bree | G06V 10/60 |

FOREIGN PATENT DOCUMENTS

| | | | |
|---|---|---|---|
| WO | 2008091428 A1 | 7/2008 | |
| WO | WO-2013102261 A1 * | 7/2013 | ......... G06F 3/03547 |
| WO | WO-2017033386 A1 * | 3/2017 | |

OTHER PUBLICATIONS

ISA/RU; International Search Report and Written Opinion for International Patent Application No. PCT/US20/23760 dated Jun. 11, 2020, 8 pages.

WIPO, International Preliminary Report on Patentability for corresponding PCT Patent Application No. PCT/US2020/023760, dated Sep. 16, 2021, 5 pages.

* cited by examiner

INFRARED AND BROAD SPECTRUM ILLUMINATION FOR SIMULTANEOUS MACHINE VISION AND HUMAN VISION

CROSS-REFERENCE TO RELATED APPLICATION

This application is a continuation of International Patent Application No. PCT/US20/23760, filed on Mar. 20, 2020, which claims the benefit of Provisional Patent Application No. 62/821,981, filed on Mar. 21, 2019, the entire contents of both are incorporated herein by reference.

TECHNICAL FIELD

The present invention relates generally to a manufacturing monitoring system, and more specifically, to a visual monitoring system configured for providing optimized illumination for simultaneous machine vision and human vision.

BACKGROUND

Cameras that monitor, record video and inspect an industrial process provide critical feedback to operations to optimize the realized capacity (e.g. reduce waste, reduce delay and increase speed) of the process. Cameras must provide the highest quality resolution possible and in many cases require a dedicated light source to allow the camera to operate at optimum parameters (e.g. shutter speed/exposure, depth of field, contrast and dynamic range). Many of these cameras are positioned in locations of heavy stream and water vapor that inhibit the camera's ability to capture usable images. Traditional broad spectrum (white) lights are not effective in these areas as the light illuminates the steam between the camera and the area to be monitored. Non-visible infrared (IR) light is effective in providing the correct illumination for the cameras in these areas. However, the IR light does not provide any process lighting for operators to safely navigate these locations in the manufacturing process. Adding additional broad-spectrum lighting for general process lighting in the same location as IR lighting renders the effectiveness of the IR illumination useless.

Accordingly, a need exists for devices, systems and methods for providing optimized illumination for simultaneous machine vision and human vision.

SUMMARY

This Summary is provided to introduce a selection of concepts in a simplified form that are further described below in the Detailed Description of Illustrative Embodiments. This Summary is not intended to identify key features or essential features of the claimed subject matter, nor is it intended to be used to limit the scope of the claimed subject matter.

Disclosed herein are methods, systems, and devices for solving the problem of providing optimized illumination for simultaneous machine vision and human vision. According to one embodiment, a method is disclosed for such a system. The system includes a first illumination control output configured to provide first illumination timing information for a first illumination source. The system also includes a second illumination control output configured to provide second illumination timing information for a second illumination source. The first illumination source is configured to provide a first frequency band of illumination. The second illumination source is configured to provide a second frequency band of illumination. The first and second frequency bands are mutually exclusive.

In some embodiments, the system may include a first camera control output configured to provide first camera timing information to a first camera. The first illumination timing information may include first active cycle times and the second illumination timing information may include second active cycle times. The first and second active cycle times may be mutually exclusive. The first illumination source may include a first light-emitting-diode (LED) array and the second illumination source may include a second LED array.

The first camera timing information may include a first camera frame rate and a first camera per frame exposure time. The first camera frame rate may be approximately 24 frames per second (fps), 30 fps, 60 fps, 120 fps, or the like. In some embodiments, the first camera per frame exposure time may be between 100 microseconds and 300 microseconds. In other embodiments, the first camera per frame exposure time may be less than 100 microseconds. In still other embodiments, the first camera per frame exposure time may be greater than 300 microseconds.

The first illumination source may be further configured to provide the first frequency band of illumination during active exposure intervals of the first camera. The second illumination source is further configured to provide the second frequency band of illumination during non-active exposure intervals of the first camera. The first frequency band of illumination may be centered in a range between 820 nanometers and 880 nanometers. The second frequency band of illumination may be centered in a range between 380 nanometers and 740 nanometers.

The system further may further include a camera interface configured to receive a plurality of images from the first camera. The camera interface may be an Ethernet interface.

In some embodiments, the first illumination control output may be further configured to provide first illumination intensity information. The first illumination source may be further configured to provide a first lumen level between 100,000 lumens and 500,000 lumens based on the first illumination intensity information. The second illumination control output may be further configured to provide second illumination intensity information. The second illumination source may be further configured to provide a second lumen level between 100,000 lumens and 500,000 lumens based on the second illumination intensity information. In other embodiments, the first illumination source may be further configured to provide a first lumen level between 1000 lumens and 100,000 lumens based on the first illumination intensity information. The second illumination source may be further configured to provide a second lumen level between 1000 lumens and 100,000 lumens based on the second illumination intensity information. The first illumination control output may be a first controlled current source and the second illumination control output may be a second controlled current source. In other embodiments, the first illumination control output may be a first controlled voltage source and the second illumination control output may be a second controlled voltage source.

In some embodiments, the first illumination source may be configured to provide machine vision illumination for a manufacturing process and the second illumination source may be configured to provide human vision illumination for the manufacturing process. In certain embodiments, the manufacturing process may be a paper manufacturing process.

In certain embodiments, the system may include a first camera synchronization input that is configured to receive the first camera timing information from the first camera.

In another embodiment, a method is implemented on at least one computing device for providing simultaneous machine vision illumination control and human vision illumination control. The method includes providing first illumination timing information and first intensity level information for a first illumination source using a first illumination control output. The method also includes providing second illumination timing information and second intensity level information for a second illumination source using a second illumination control output. The first illumination source is configured to provide a first frequency band of illumination and the second illumination source is configured to provide a second frequency band of illumination. The first frequency band of illumination and the second frequency band of illumination are mutually exclusive.

In another embodiment, a non-transitory computer-readable storage medium is disclosed for providing simultaneous machine vision illumination control and human vision illumination control. The non-transitory computer-readable storage medium stores instructions to be implemented on at least one computing device including at least one processor. The instructions when executed by the at least one processor cause the at least one computing device to perform a method. The method includes providing first illumination timing information and first intensity level information for a first illumination source using a first illumination control output. The method also includes providing second illumination timing information and second intensity level information for a second illumination source using a second illumination control output. The first illumination source is configured to provide a first frequency band of illumination and the second illumination source is configured to provide a second frequency band of illumination. The first frequency band of illumination and the second frequency band of illumination are mutually exclusive.

In another embodiment, a control device is disclosed for providing simultaneous machine vision illumination control and human vision illumination control. The control device includes digital circuitry and a first illumination control output electrically coupled with the digital circuitry. The first illumination control output is configured to provide first illumination timing information and first intensity level information for a first illumination source. The control device also includes a second illumination control output electrically coupled with the digital circuitry. The second illumination control output is configured to provide second illumination timing information and second intensity level information for a second illumination source. The first illumination source is configured to provide a first frequency band of illumination and the second illumination source is configured to provide a second frequency band of illumination. The first frequency band of illumination and the second frequency band of illumination are mutually exclusive. The digital circuitry may be implemented in an application-specific integrated circuit (ASIC), a field-programmable gate array (FPGA), discrete logic/circuity, or a combination thereof.

BRIEF DESCRIPTION OF THE DRAWINGS

The foregoing summary, as well as the following detailed description of preferred embodiments, is better understood when read in conjunction with the appended drawings. For the purposes of illustration, there is shown in the drawings exemplary embodiments; however, the presently disclosed invention is not limited to the specific methods and instrumentalities disclosed. In the drawings.

DETAILED DESCRIPTION

The presently disclosed subject matter is described with specificity to meet statutory requirements. However, the description itself is not intended to limit the scope of this patent. Rather, the inventors have contemplated that the claimed invention might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

These sections may be present in some industrial processes such as that which may be found in a paper production facility, but the systems and methods disclosed herein are equally applicable to other industrial settings.

In general, this disclosure discloses how a light-emitting diode (LED) array may be designed to include both infra-red (IR) and white illuminators. A camera clock and LED driver are synchronized together such that during the capture time of the camera (on-time) the IR LED's are on and during the off-time of the camera frame capture the white LED's are on.

Figure 1:
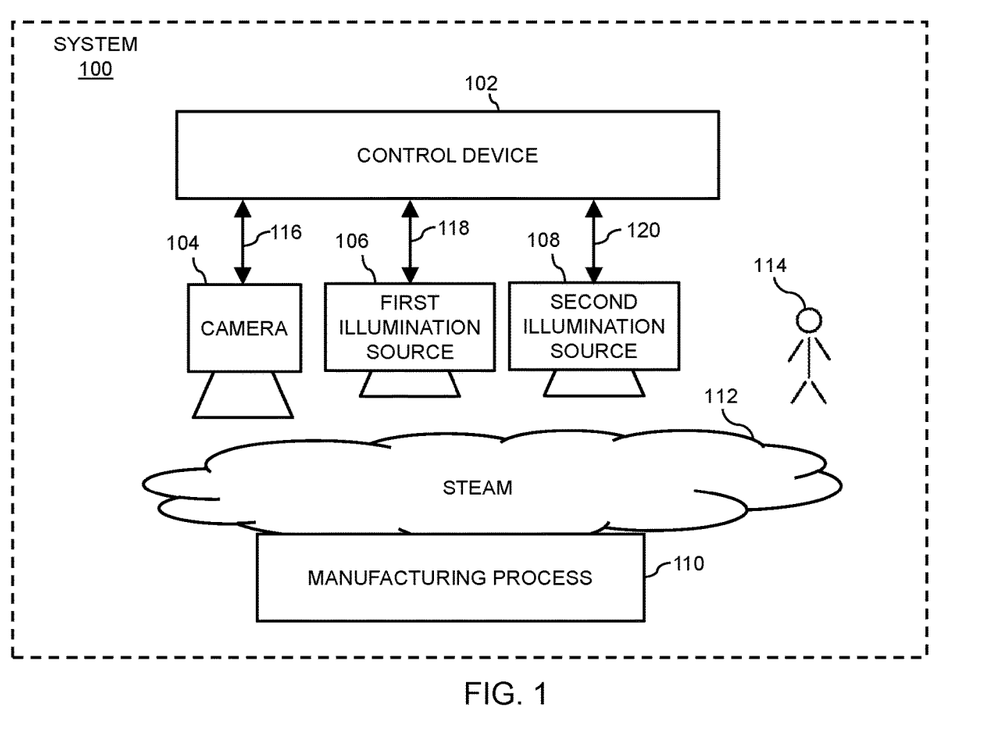
FIG. 1 depicts a block diagram illustrating a system including a control device for providing simultaneous machine vision illumination control and human vision illumination control in accordance with embodiments of the present disclosure.
Figure 2:
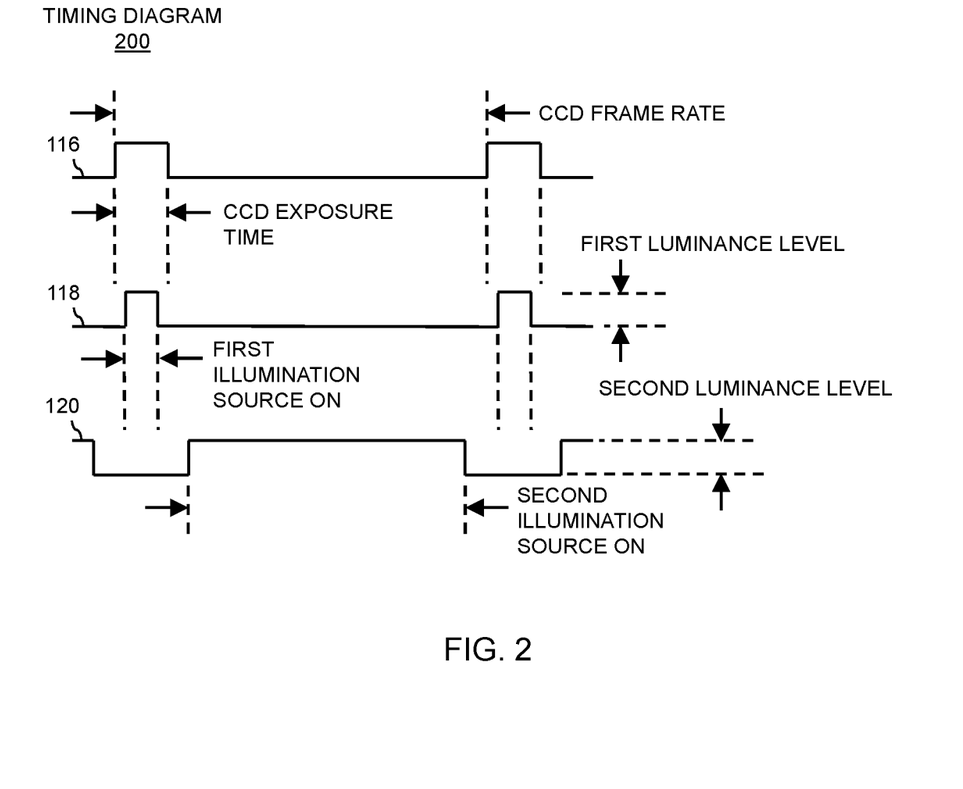
FIG. 2 depicts a timing diagram illustrating control signals provided for a camera and two illumination sources in accordance with embodiments of the present disclosure.

A common frame rate of a camera may be 60 frames per second. This frame rate equates to an image capture every 16,666 microseconds. For each frame capture, the camera is actively acquiring the image to the sensor (called exposure or shutter speed) only a fraction of the overall cycle. The sensor is then idle until the next frame capture. The IR LED array is set to fire at the beginning of the frame capture at some duration equal to or less than the exposure time. If the camera is set to expose for 200 microseconds there are over 16,000 microseconds the IR LED is off per frame cycle. The combination IR and white LED system will fire the white LED just after the IR and will stop just before the next frame capture. In this way the camera sensor is exposed only to IR LED energy while the white LED provides visible light to the same area for general purpose human visible illumination. FIG. 1 and FIG. 2 provide more detail on this disclose concept.

FIG. 1 depicts a block diagram illustrating a system 100 for providing simultaneous machine vision illumination control and human vision illumination control in accordance with embodiments of the present disclosure. The system 100 includes a control device 102, a camera 104, a first illumination source 106, and a second illumination source 108. The system 100 also includes a manufacturing process 110 that produces steam 112. The system 100 further includes a human 114 that is located to monitor the manufacturing process 110. The control device 102 provides a camera control output signal 116. The control output signal 116 provides camera timing information to the camera 104. The control device 102 also provides first illumination control output signal 118 provides first illumination timing information and first intensity level information for the first illumination source. The control device 102 additionally provides a second illumination control output signal 120 provides second illumination timing information and second intensity level information for the second illumination source. In some embodiment, timing information and intensity level information may be provided as separate signals.

The control device 102 may be a computing device. For example, the control device 102 may be a personal computer (PC) with a specialized controller card, a microcontroller, or the like. The control device 102 may also be an application-specific integrated circuit (ASIC), a field-programmable gate array (FPGA), discrete logic/circuity, or a combination thereof.

The camera 104 includes a charge-coupled device (CCD) that acts as an image sensor for capturing high resolution images of the manufacturing process 110. In other embodiments the camera 104 includes a complementary metal-oxide-semiconductor (CMOS) sensor or an N-type metal-oxide-semiconductor (NMOS) sensor for capturing the high resolution images. The camera is configured to operate at one more specific frame rates. Typical frame rates may be 24 frames-per-second (fps), 30 fps, 60 fps, 120 fps, etc. The images may have a pixel resolution of 1280×720, 1920×1080, 3840×2160, 7680×4320, etc. The camera may also be configured to provide the control device 102 a plurality of images as requested via a camera interface. The camera interface may be an Ethernet interface. For example, the Ethernet interface may be GigE, Dual GigE, 5GigE, 10 GigE, or the like. In other embodiments, the camera interface may be a Camera Link HS interface, a CoaXPress® interface, a Universal Serial Bus (USB) 3.0 interface, or the like.

The first illumination source 106 may include a first LED array and the second illumination source may include a second LED array. In some embodiments, the first LED array and the second LED array may be housed in a single lighting structure and positioned to illuminate the manufacturing process 110 and also the steam 112. The first illumination source (e.g. the first LED array) may be configured to provide a first frequency band of illumination and the second illumination source (e.g. the second LED array) may be configured to provide a second frequency band of illumination. The first and second frequency bands of illumination may be mutually exclusive. For example, the first frequency band of illumination may be centered in a range between 820 nanometers and 880 nanometers. This wavelength provides the camera 104 with the ability to capture images of the manufacturing process 110, while not being obscured by the steam 112. The second frequency band of illumination may be centered at a wavelength range between 380 nanometers and 740 nanometers. The wavelengths within this wavelength range provide the human 114 with the ability to still see the steam 112 while monitoring the manufacturing process 110 and thus prevent injury.

In some embodiments (not shown in FIG. 1), the control device 102 may be configured to provide additional control signals to additional cameras and additional illumination sources. Additionally, the camera 104 may be decoupled from the control device 102, and be configured to sync to the first illumination source via an image capture process. Basically the camera 104 would sync its internal frame rate and a CCD exposure time to the pattern provided by the first illumination source. In other embodiments, the control device 102 may be embedded in the camera 104, the first illumination source 106, or the second illumination source 108.

FIG. 2 depicts a timing diagram 200 illustrating the control signals of FIG. 1 provided for the camera, the first illumination source, and the second illumination source in accordance with embodiments of the present disclosure. The camera control output signal 116, the first illumination control output signal 118, and the second illumination control output signal 120 are each depicted as one of a voltage signal or a current signal; and may be provided by controlled voltage sources and/or controlled current sources from the control device 102.

The camera control output signal 116 provides an active high signal during a CCD exposure time. The first illumination control output signal 118 and the second illumination control output signal 120 provide both timing for on/off and luminance levels for the first and second illumination sources. A cycle begins with the second illumination source on (i.e. providing illumination for human vision), the first illumination source off, and the CCD exposure off. After the second illumination source turns off, the CCD exposure begins. Next the first illumination source turns on to a luminance level based on an amplitude of either current or voltage level of the first illumination control output signal 118 (i.e. providing illumination for the machine vision). The first illumination source may be configured to provide a lumen level between 100,000 lumens and 500,000 lumens based on the first illumination intensity information (i.e. first luminance level). After the second illumination source turns off, the CCD exposure time ends. Next the second illumination source turns on to a luminance level based on an amplitude of either current or voltage level of the second illumination control output signal 120 (i.e. providing illumination again for human vision). The second illumination source may also be configured to provide a lumen level between 100,000 lumens and 500,000 lumens based on the second illumination intensity information (i.e. second luminance level). In other embodiments the first illumination source may be configured to provide a lumen level between 1000 lumens and 100,000 lumens based on the first illumination intensity information (i.e. first luminance level). And, the second illumination source may also be configured to provide a lumen level between 1000 lumens and 100,000 lumens based on the second illumination intensity information (i.e. second luminance level).

Basically, the first and second illumination timing information comprises active cycle times (i.e. the time between a rising edge and a falling edge of each waveform). As depicted the first illumination timing information and second illumination timing information are mutually exclusive (i.e. active cycles do not overlap).

Figure 3:
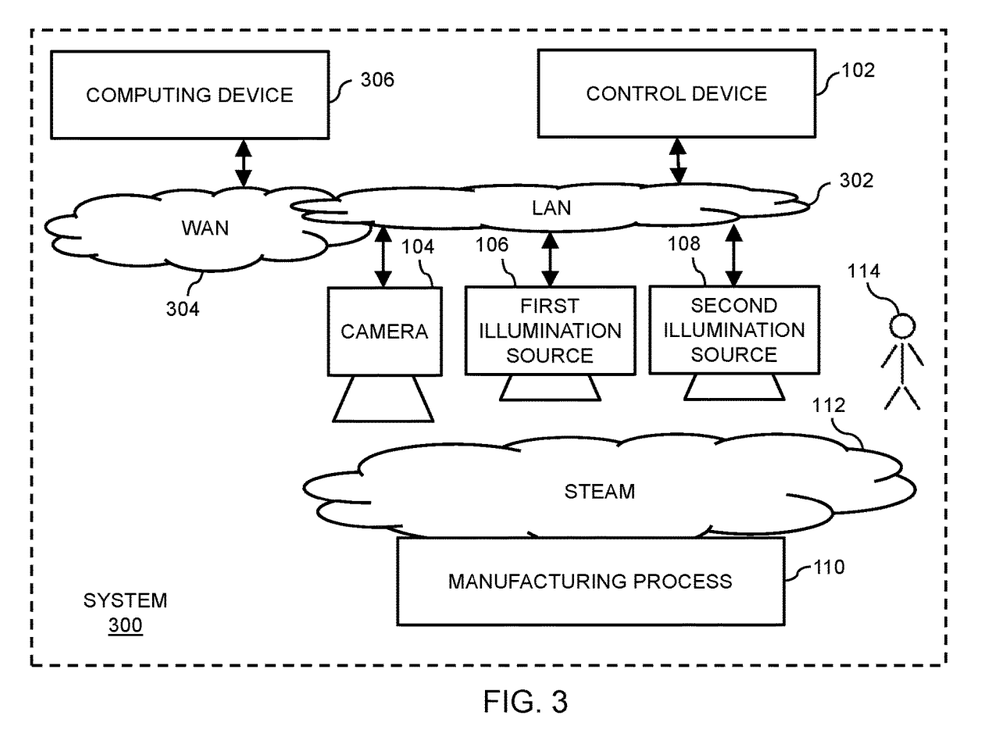
FIG. 3 depicts a block diagram illustrating another system including a computing device for providing simultaneous machine vision illumination control and human vision illumination control in accordance with embodiments of the present disclosure.

FIG. 3 depicts another block diagram illustrating a system 300 for providing simultaneous machine vision illumination control and human vision illumination control in accordance with embodiments of the present disclosure. The system 300 includes the system 100 of FIG. 1 with the addition of a local area network (LAN) 302, a wide area network (WAN) 304, and a computing device 306. The camera control output signal 116, the first illumination control output signal 118, and the second illumination control output signal 120 are each provided as digital signals over the LAN 302. The computing device 306 may be configured to provide setup information to the control device 102 over the WAN 304 and LAN 302. In some embodiments, the WAN 304 is the Internet and the computing device 306 may be one or more servers in a cloud computing environment. In other embodiments, the computing device 306 may be a personal computer, or the like. The setup information may be used by the control device 102 when configuring the camera control output signal 116, the first illumination control output signal 118, and the second illumination control output signal 120. The computing device 306 may also be configured to receive a plurality of images from the camera 104 and generate the setup information based on processing the plurality of images. The computing device may use a soft development kit (SDK) and process the plurality of images using machine vision algorithms that leverage both central processing units (CPSs) and graphical process units (GPUs).

In some embodiments, the LAN 302 may be an Industrial Ethernet (IE). The LAN 302 may include standard Ethernet network infrastructure including switches, hubs, and repeaters. In this embodiment, the camera control output signal 116, the first illumination control output signal 118, and the second illumination control output signal 120 may be provided using one or more real-time protocols associated with IE, such as the Institute of Electrical and Electronics Engineers (IEEE) 1588-2008 (or later) standard titled "IEEE Standard for a Precision Clock Synchronization Protocol for Networked Measurement and Control Systems". The computing device 306 may also be located directly on the LAN 302. In certain embodiments, the computing device 306 and the control device 102 may be the same device.

Figure 4:
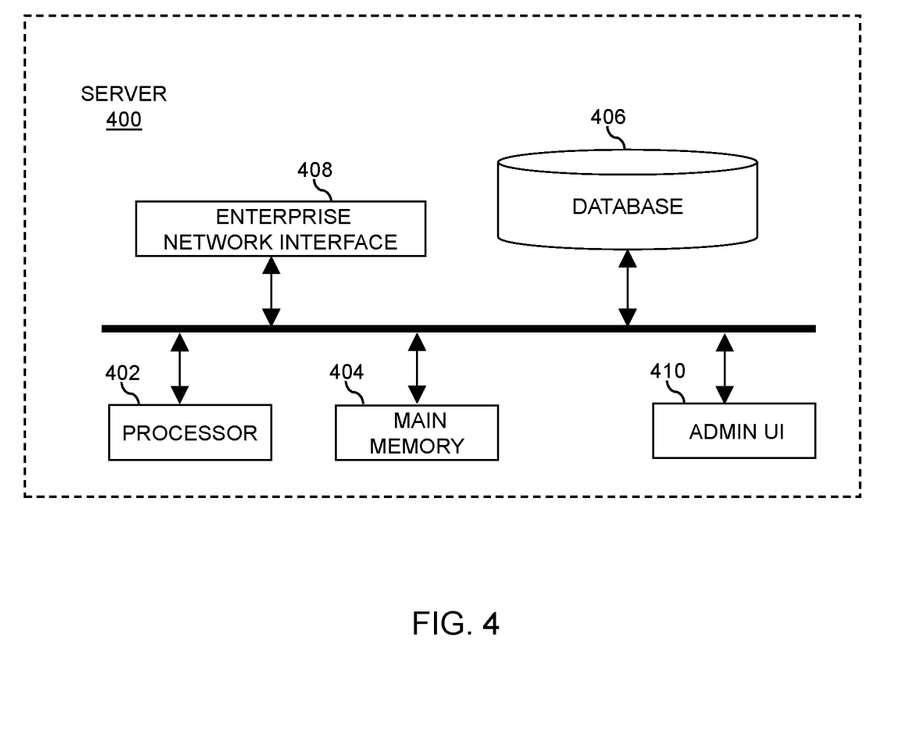
FIG. 4 depicts a block diagram illustrating a server for providing the computing device of FIG. 3 in accordance with embodiments of the present disclosure.

FIG. 4 depicts a block diagram illustrating a server 400 for providing the computing device 306 of the system 300 of FIG. 3 in accordance with embodiments of the present disclosure. The server 400 may include at least one of a processor 402, a main memory 404, a database 406, an enterprise network interface 408, and an administration user interface (UI) 410.

The processor 402 may be a multi-core server class processor suitable for hardware virtualization. The processor may support at least a 64-bit architecture and a single instruction multiple data (SIMD) instruction set. The main memory 404 may include a combination of volatile memory (e.g. random access memory) and non-volatile memory (e.g. flash memory). The database 406 may include one or more hard drives.

The enterprise network interface 408 may provide one or more high-speed communication ports to enterprise switches, routers, and/or network storage appliances. The enterprise network interface 408 may include high-speed optical Ethernet, InfiniB and (IB), Internet Small Computer System Interface iSCSI, and/or Fibre Channel interfaces. The administration UI may support local and/or remote configuration of the server 600 by a network administrator.

Figure 5:
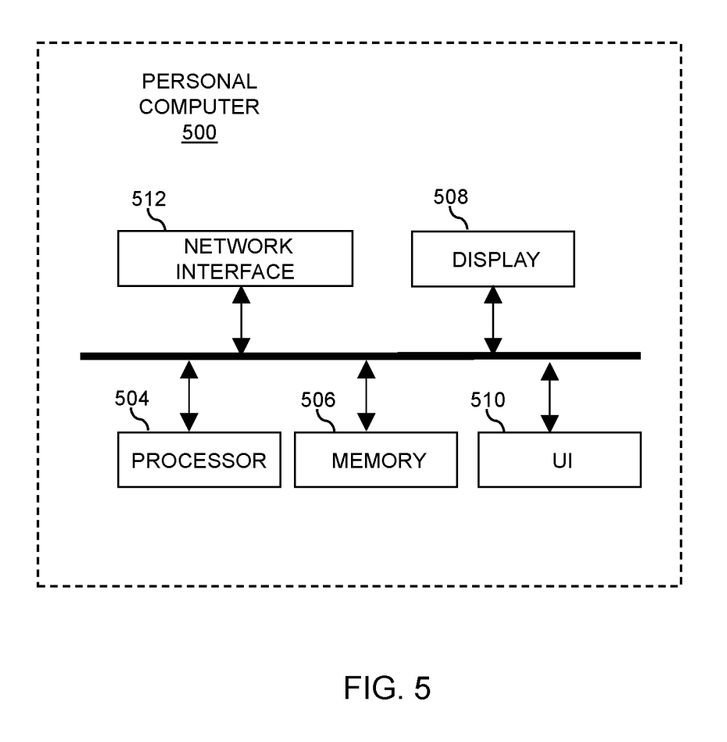
FIG. 5 depicts a block diagram illustrating a personal computer for providing the computing device of FIG. 3 in accordance with embodiments of the present disclosure.

FIG. 5 depicts a block diagram illustrating a personal computer 500 for providing the computing device 306 of FIG. 3 in accordance with embodiments of the present disclosure The personal computer 500 may include at least a processor 504, a memory 506, a display 508, a user interface (UI) 510, and a network interface 512. The personal computer 500 may include an operating system such as a Windows® OS, a Macintosh® OS, a Linux® OS, or the like. The memory 506 may include a combination of volatile memory (e.g. random access memory) and non-volatile memory (e.g. solid state drive and/or hard drives). The display 508 may be an external display (e.g. computer monitor) or internal display (e.g. laptop). The UI 510 may include a keyboard, and a pointing device (e.g. mouse). The network interface 512 may be a wired Ethernet interface or a Wi-Fi interface.

In summary, a first illumination source is configured to provide machine vision illumination for a manufacturing process; and a second illumination source is configured to provide human vision illumination for the manufacturing process. In certain embodiments, the manufacturing process may be a paper manufacturing process.

The various techniques described herein may be implemented with hardware or software or, where appropriate, with a combination of both. Thus, the methods and apparatus of the disclosed embodiments, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the presently disclosed invention. In the case of program code execution on programmable computers, the computer will generally include a processor, a storage medium readable by the processor (including volatile and non-volatile memory and/or storage elements), at least one input device and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The described methods and apparatus may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the presently disclosed invention. When implemented on a general-purpose processor, the program code combines with the processor to provide a unique apparatus that operates to perform the processing of the presently disclosed invention.

While the embodiments have been described in connection with the preferred embodiments of the various figures, it is to be understood that other similar embodiments may be used or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed:
1. A system comprising:
  a machine vision illumination control output configured to provide machine vision illumination timing information for a machine vision illumination source; and
  a human vision illumination control output configured to provide human vision illumination timing information for a human vision illumination source, wherein:
    the machine vision illumination source is configured to provide a machine vision frequency band of illumi- nation configured for concealing an obfuscation within a manufacturing process for a camera monitoring system; and the human vision illumination source is configured to provide a human vision frequency band of illumination configured for illuminating the obfuscation within the manufacturing process for a human.

2. The system of claim 1 further comprising a camera control output configured to provide camera timing information to a camera and the camera timing information includes a camera frame rate and a camera per frame exposure time.

3. The system of claim 2 wherein:
the machine vision illumination timing information comprises machine vision active cycle times;
the human vision illumination timing information comprises human vision active cycle times; and
the machine vision active cycle times and the human vision active cycle times are mutually exclusive.

4. The system of claim 3 wherein the machine vision illumination source is further configured to provide the machine vision frequency band of illumination during active exposure intervals of the camera and the human vision illumination source is further configured to provide the human vision second frequency band of illumination during non-active exposure intervals of the camera.

5. The system of claim 4 wherein the machine vision first frequency band of illumination is centered in a range between 820 nanometers and 880 nanometers and the human vision frequency band of illumination is centered in a range between 380 nanometers and 740 nanometers.

6. The system of claim 1 wherein the machine vision illumination control output is further configured to provide machine vision illumination intensity information and the human vision illumination control output is further configured to provide human vision illumination intensity information.

7. The system of claim 6 wherein the machine vision first illumination source is further configured to provide a machine vision first lumen level between 100,000 lumens and 500,000 lumens based on the machine vision first illumination intensity information and the human vision second illumination source is further configured to provide a human vision second lumen level between 100,000 lumens and 500,000 lumens based on the human vision second illumination intensity information..

8. The system of claim 6 wherein the machine vision illumination source is further configured to provide a first lumen level between 1000 lumens and 100,000 lumens based on the machine vision illumination intensity information and the human vision illumination source is further configured to provide a human vision lumen level between 1000 lumens and 100,000 lumens based on the human vision illumination intensity information.

9. The system of claim 1 wherein the machine vision illumination control output is a machine vision controlled current source and the human vision illumination control output is a human vision controlled current source.

10. The system of claim 1 wherein the machine vision illumination control output is a machine vision controlled voltage source and the human vision illumination control output is a human vision controlled voltage source.

11. The system of claim 1 wherein the obfuscation presents a safety hazard for operators involved in the manufacturing process.

12. The system of claim 1 wherein the manufacturing process is a paper manufacturing process and the obfuscation is steam.

13. The system of claim 1 further comprising a camera synchronization input configured to receive camera timing information from a camera.

14. The system of claim 13 wherein the camera timing information includes a camera frame rate and a camera per frame exposure time.

15. The system of claim 14 wherein the camera per frame exposure time is between 100 microseconds and 300 microseconds.

16. The system of claim 14 wherein the camera per frame exposure time is less than 100 microseconds.

17. The system of claim 14 wherein the camera per frame exposure time is greater than 300 microseconds.

18. The system of claim 1 wherein the machine vision illumination source includes a machine vision light-emitting-diode (LED) array and the human vision illumination source includes a second LED array.

19. A method implemented on at least one computing device, the method comprising:
providing machine vision illumination timing information for a machine vision illumination source using a illumination control output; and
providing human vision illumination timing information for a human vision illumination source using a second illumination control output, wherein:
the machine vision illumination source is configured to provide a machine vision frequency band of illumination configured for concealing an obfuscation within a manufacturing process for a camera monitoring system; and
the human vision illumination source is configured to provide a human vision frequency band of illumination configured for illuminating the obfuscation within the manufacturing process for a human.

20. A non-transitory computer-readable storage medium, the non-transitory computer-readable storage medium storing instructions to be implemented on at least one computing device including at least one processor, the instructions when executed by the at least one processor cause the at least one computing device to perform a method of:
providing machine vision illumination timing information for a machine vision illumination source using a illumination control output; and
providing human vision illumination timing information for a human vision illumination source using a second illumination control output, wherein:
the machine vision illumination source is configured to provide a machine vision frequency band of illumination configured for concealing an obfuscation within a manufacturing process for a camera monitoring system; and
the human vision illumination source is configured to provide a human vision frequency band of illumination configured for illuminating the obfuscation within the manufacturing process for a human.

* * * * *